United States Patent [19]

Andre

[11] Patent Number: 5,067,862
[45] Date of Patent: Nov. 26, 1991

[54] UNITARY CARRYING ASSEMBLY OR UNIT FOR MOTOR-CAR TRAILER VEHICLES

[75] Inventor: Jean-Luc Andre, Dangolsheim, France

[73] Assignee: Lohr Industrie, S.A., Les Coteaux, France

[21] Appl. No.: 359,308

[22] Filed: May 31, 1989

[30] Foreign Application Priority Data

May 31, 1988 [FR] France ............................... 88 07385

[51] Int. Cl.[5] .......................... B60P 3/08; B61D 3/18
[52] U.S. Cl. ......................................... 410/26; 410/8; 410/24
[58] Field of Search ................. 410/4, 6, 8, 3, 15, 410/24, 24.1, 26, 27, 29.1; 414/228, 229, 230, 477, 478, 495, 537; 254/102

[56] References Cited

U.S. PATENT DOCUMENTS

| | | | |
|---|---|---|---|
| 2,934,319 | 4/1960 | Wahlstrom | 254/102 |
| 3,880,457 | 4/1975 | Jones, Jr. | 410/29.1 |
| 4,081,196 | 3/1978 | Dandridge, Jr. | 410/24.1 |
| 4,369,008 | 1/1983 | Cooper | 410/29.1 |
| 4,609,179 | 9/1986 | Chern et al. | 254/102 |
| 4,804,066 | 2/1989 | Fusaro et al. | 414/229 X |

Primary Examiner—Joseph F. Peters, Jr.
Assistant Examiner—Virna Lissi Mojica
Attorney, Agent, or Firm—Schwartz & Weinrieb

[57] ABSTRACT

Unitary carrier assembly distinguished in that each individual platform (9) is mounted movable with regard to its two supporting posts (2) and (3) by a carrier and lifting mechanism present between each post and each platform comprising a translation device (7) or (8) on a single screw (5) or (6) per post and for each post an articulation with the platform and at least one slanting articulated linkage (13) connecting the platform to the translation device.

This invention is of interest particularly to builders of transport equipment.

16 Claims, 9 Drawing Sheets

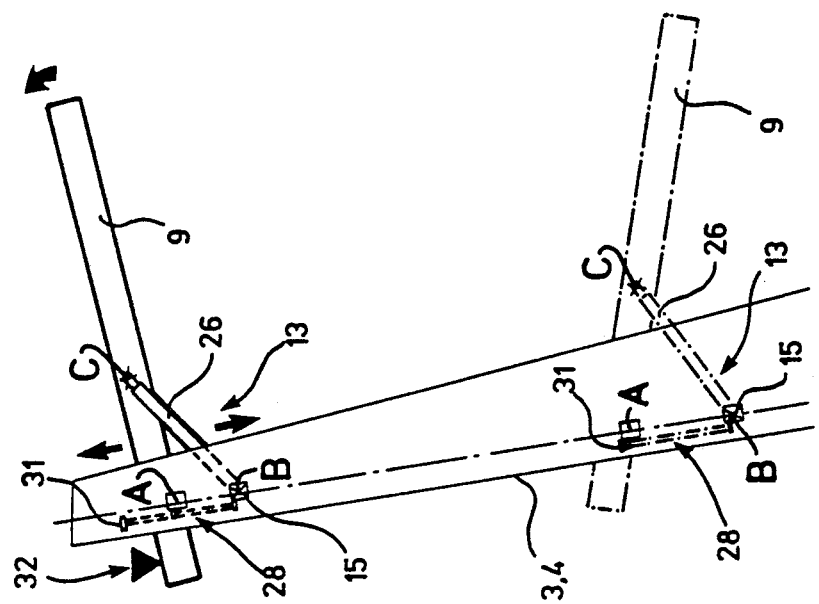
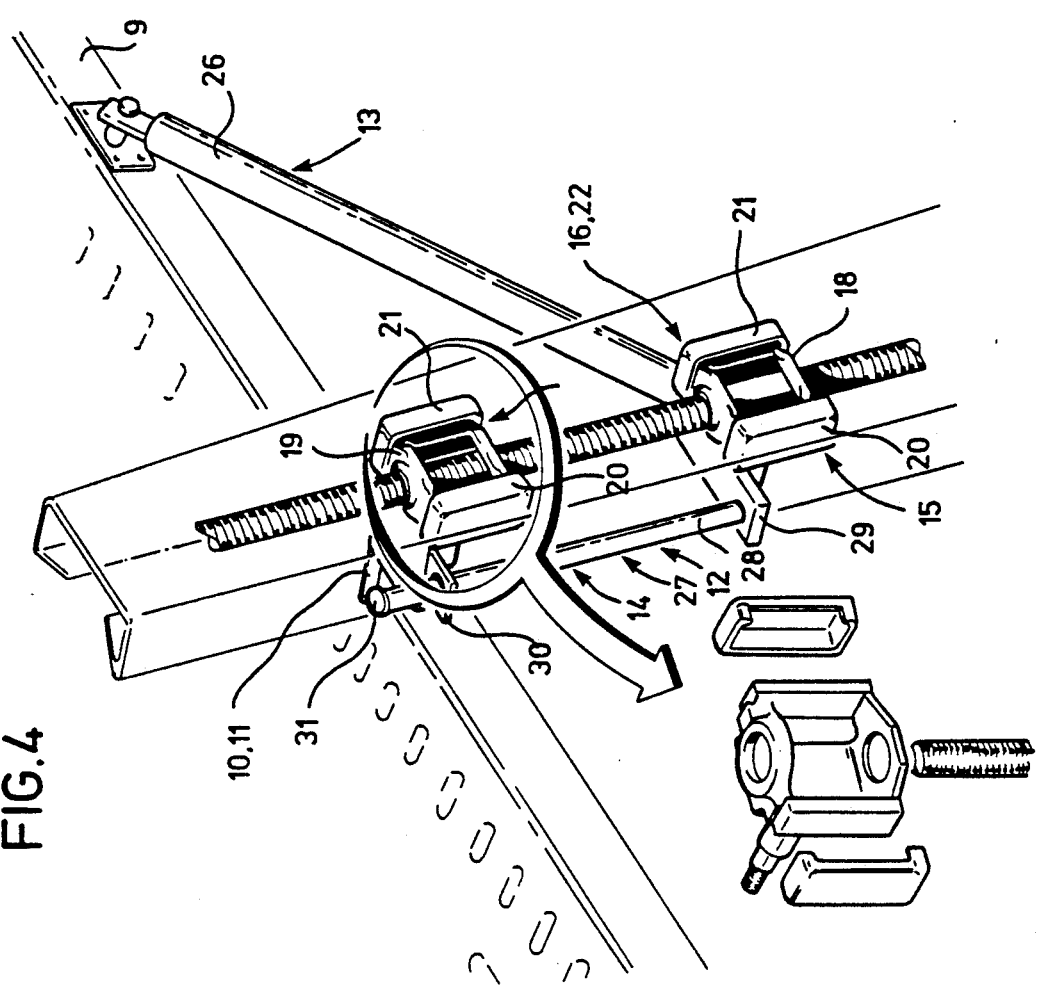

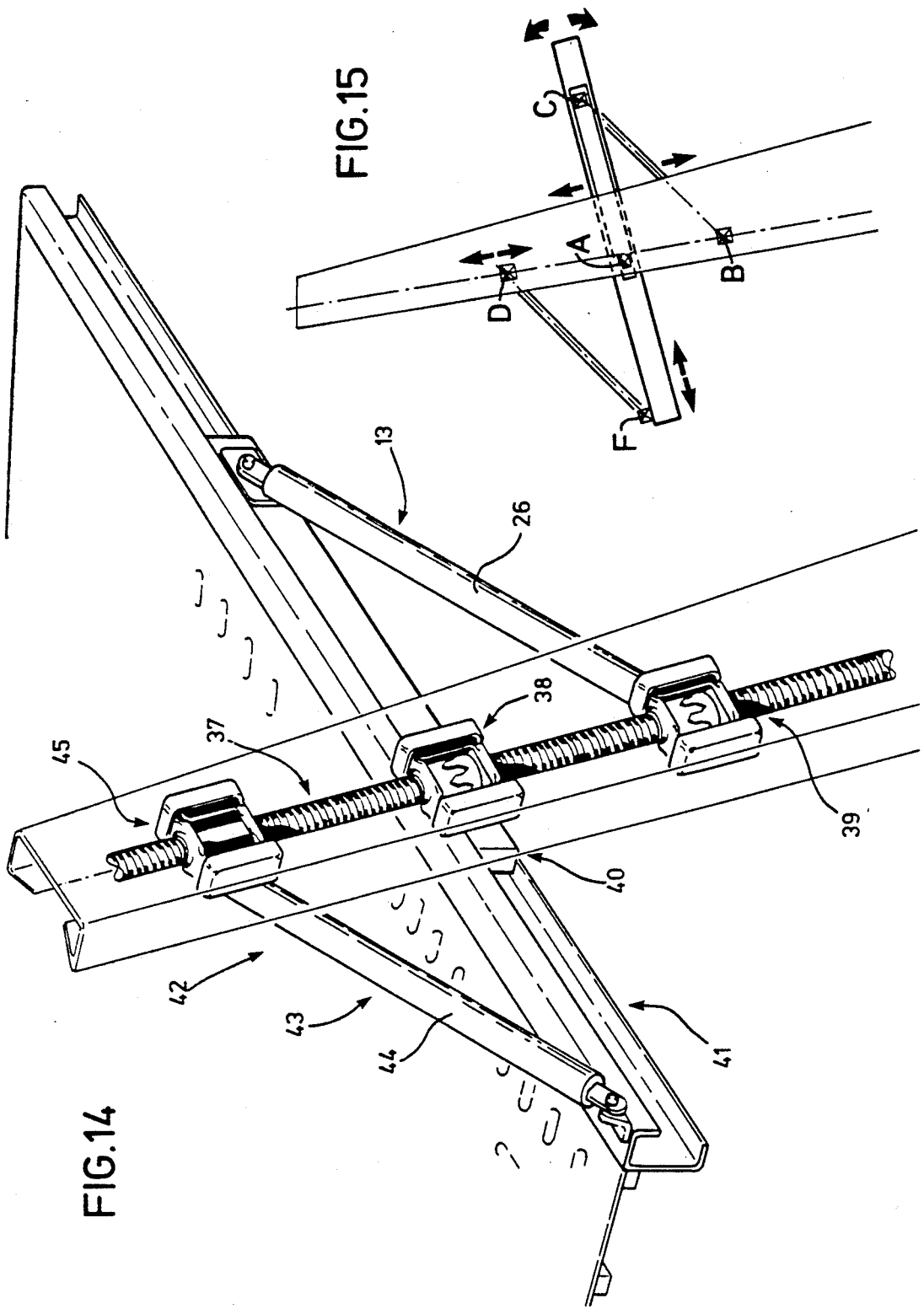

5,067,862

UNITARY CARRYING ASSEMBLY OR UNIT FOR MOTOR-CAR TRAILER VEHICLES

FIELD OF THE INVENTION

The present invention relates to a unitary carrier and lifting assembly comprising at least one individual movable carrier platform for constituting an automobile transport vehicle.

BACKGROUND OF THE INVENTION

According to the general characteristic of this unitary carrier assembly, each individual platform is capable of transverse and longitudinal movements with respect to the supporting posts and of tilting movements with respect to the horizontal from a single drive means proper to each individual platform.

The use of individual platforms provides greater flexibility in loading and the possibility of overlapping the vehicles on one and the same carrier.

However, to be able to derive all the benefits from this characteristic, it is advisable, to obtain profitable loading, to bring about all lifting positions and all inclinations from a single mechanical control means in the simplest and fastest way.

This is precisely the aim of the invention.

Presently existing individual carrier platforms are mounted so as to be vertically movable by means of jacks along telescopic assemblies or profiled rectangular elements forming part of a structure, upon the base on which they rest.

The inclination of these platforms is fixed or secured by slanting jacks, coupled with a sliding structure fixed by one of its ends to the frame of the towing vehicle or of its trailer and by its other end to upper framework elements.

The drawbacks of this type of individual platforms and of control of their movements prove to be multiple:
all controls are effected by jacks, thus requiring a significant increase in cost and necessitating a powerful hydraulic unit;
the very large lever arm requires the use of large-caliber jacks;
each jack is duplicated by a sliding structure along which it is displaced;
support of the slanting jacks must be dissociated from the sliding structure in upward movement, resulting in the development of difficulties in construction;
the hydraulic feed linkages of the jacks in working fluid constitute a network of troublesome flexible hoses difficult to install;
this network comprises slack hoses, representing some inconvenience in operation and in access of personnel;
jacks are arranged with the stem projecting during transport. The latter, exposed to the weather, to projections and to shocks, run the risk of being damaged;
for large movements (upper level) the travel of single-extension jacks proves to be insufficient; double-extension jacks, difficult, heavy and breakable, must be used;
for other movements effected by simple-extension jacks, the latter must be short in length.

OBJECT OF THE INVENTION

The object of the present invention is to remedy these drawbacks and to propose a unitary carrier assembly having platforms movable in multiple compound movements, characterized in that each individual platform is mounted movable with respect to its two supporting posts by a carrier and lifting mechanism present between each post and each platform, comprising a translation device on a single screw per post and for each post an articulation with the platform and at least one articulated slanting linkage connecting the platform to the translation device.

SUMMARY OF THE INVENTION

Numerous advantages derive from the technical peculiarities of the carrier assembly according to the invention, the principal ones of which are indicated below:
possibility of multiple positions and inclinations by a single operating means per post for all positions and inclinations;
simple embodiment;
mechanical strength;
possibility of effecting practically all overlaps between vehicles at different levels;
use of an irreversible operating means does not require duplication thereof for safety;
movements of displacement in lifting and in inclination are continuously variable;
reliability is increased by the use of a single operating means.

BRIEF DESCRIPTION OF THE DRAWINGS

The present invention will be readily understood upon reading the description that follows, made by way of non-limitative example, of an embodiment with reference to the accompanying drawings, in which like reference characters designate like or corresponding parts throughout the several views, and wherein:

FIG. 4 is a simplified view in perspective of a post, of the platform and of the lifting mechanism, according to a variant having a lower nut and an upper translation sleeve, a variable spacing assembly, and a rod of fixed length, with enlargement of the translation sleeve;

FIG. 5 is a corresponding functional diagram illustrating two extreme positions of the movable platform, one high and the other low;

FIG. 14 is a simplified view in perspective of a post, of the platform and of the lifting mechanism, according to a variant having two disengageable nuts and having a rod of fixed length completed by a platform sliding mechanism made up of a plain nut connected to the platform by a rod of fixed length;

FIG. 15 is a corresponding functional diagram illustrating one position of the movable platform and, by means of arrows, various possible displacements;

DETAILED DESCRIPTION OF THE INVENTION

Figure 1:
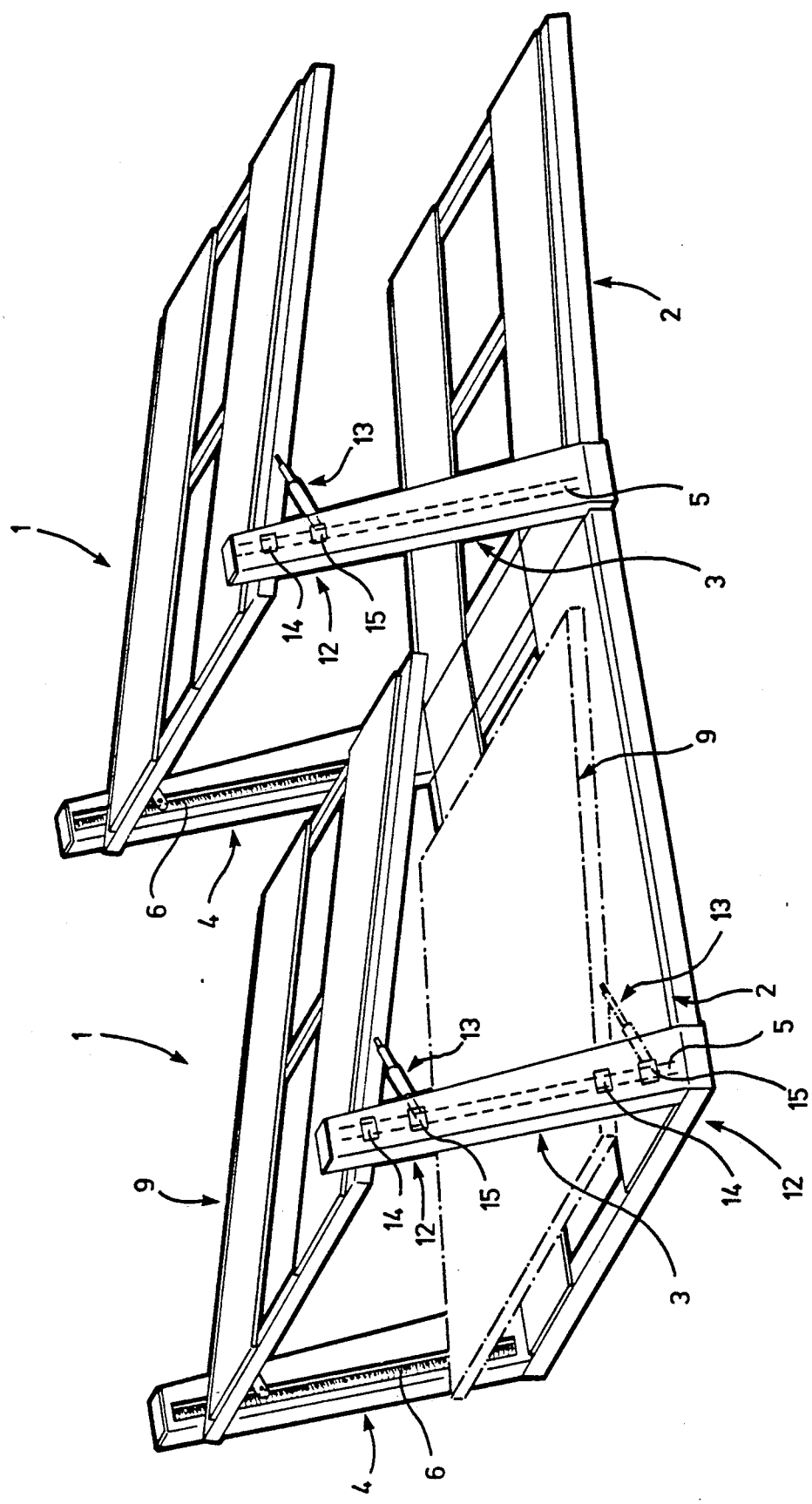
FIG. 1 is a general illustrative view in perspective of two carrier assemblies pursuant to the invention, one comprising two movable platforms in high position and in low position and the other one movable platform in high position.

The general inventive idea consists in providing, for a unitary carrier assembly having two supporting posts, at least one platform movable with respect to the posts, a platform whose movements are controlled by a single external driving force through a connecting mechanism and a rectilinear drive element proper to each post on which the said mechanism is mounted. The positions and the inclinations of high and low end of travel are predetermined by the action of the connecting mechanism associated with the rectilinear drive element and stops or points of support.

The general means utilized for implementing the general inventive idea set forth above comprise, in addition to the two supporting posts and at least one individual movable platform, a screw in each post, single and proper to each post, the screw serving as a rectilinear drive element and actuated by a single independent driving force through the linkage and carrier mechanism converting the rotation of the screw into movements of displacement with respect to the posts and into various inclinations of the platform.

The various possibilities of carrying out the functions mentioned above and their direct variants will be examined more particularly below.

With reference to the figures as a whole, the basic means of the present invention may be set forth as follows.

A unitary carrier assembly 1 is accomplished by joining to a frame 2 two supporting posts 3 and 4 parallel to one another and vertical or slightly inclined. Each supporting post includes at least one screw such as 5 or 6 on which is mounted a linkage and carrier mechanism and, more particularly, a translation device 7 or 8.

The screw is single per post and is actuated by a single driving force, proper to each post itself, associated with its linkage and carrier mechanism.

The two translation devices 7 and 8 ensure swivel and, if necessary, swivel-sliding supporting linkage with a movable carrier platform 9, of traditional form or of particular characteristics, by way of a swivel pin 10 or 11 associated, if necessary, with a sliding block.

The movable platform 9 is capable of compound movements of inclination and displacement with respect to the posts longitudinally and transversely to the latter solely by control of simultaneous operation of screws 5 and 6 from the one and only driving force, for example an electric motor.

The exact location of the swivel pin 10 or 11 of the platform with the corresponding translation and swivel device 7 or 8 matters very little, insofar as the latter does not limit the nature of the movements.

The translation and swivel device will now be described in a general way.

The said device is composed of a translation assembly 12 movable along the corresponding screw and carried by the latter, as well as an inclined articulated linkage 13 connecting the platform to the movable assembly.

The movable translation assembly 12 is made up of an upper block 14 and of a lower block 15 mounted on the one and only screw 5 or 6 per post and per platform. The upper block 14 establishes the swivel linkage with the platform and the lower block establishes the swivel articulation with one end of the inclined articulated linkage 13 so as to realize a triangular assembly articulated at three swivel points.

For the purpose of clarity, the three points of articulation will be designated by the letters A, B, C, referring respectively to the points situated on the blocks 14 and 15 and on the platform at the end of the inclined linkage 13.

Figure 3:
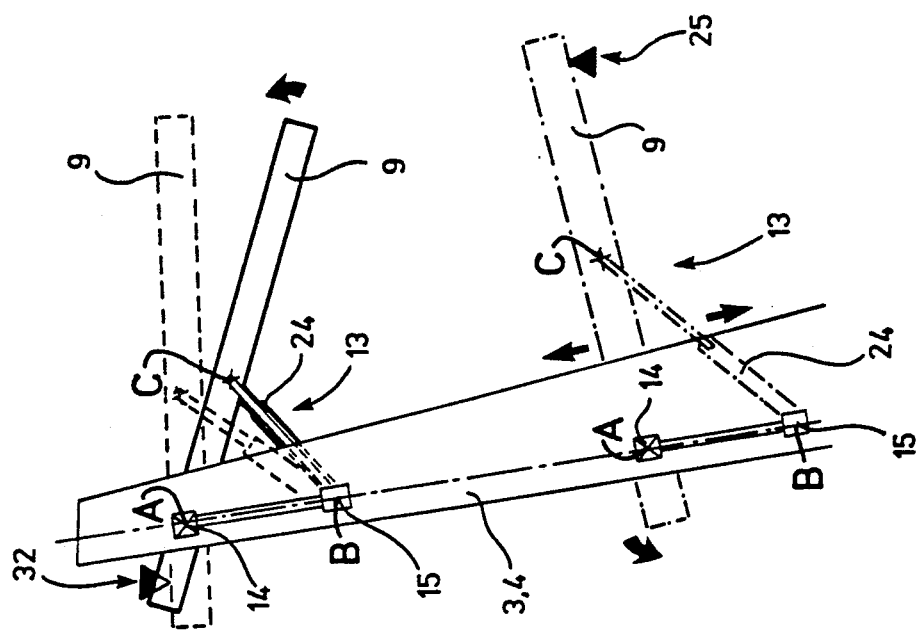
FIG. 3 is the corresponding functional diagram illustrating two extreme positions of the movable platform, one high and the other low.
Figure 2:
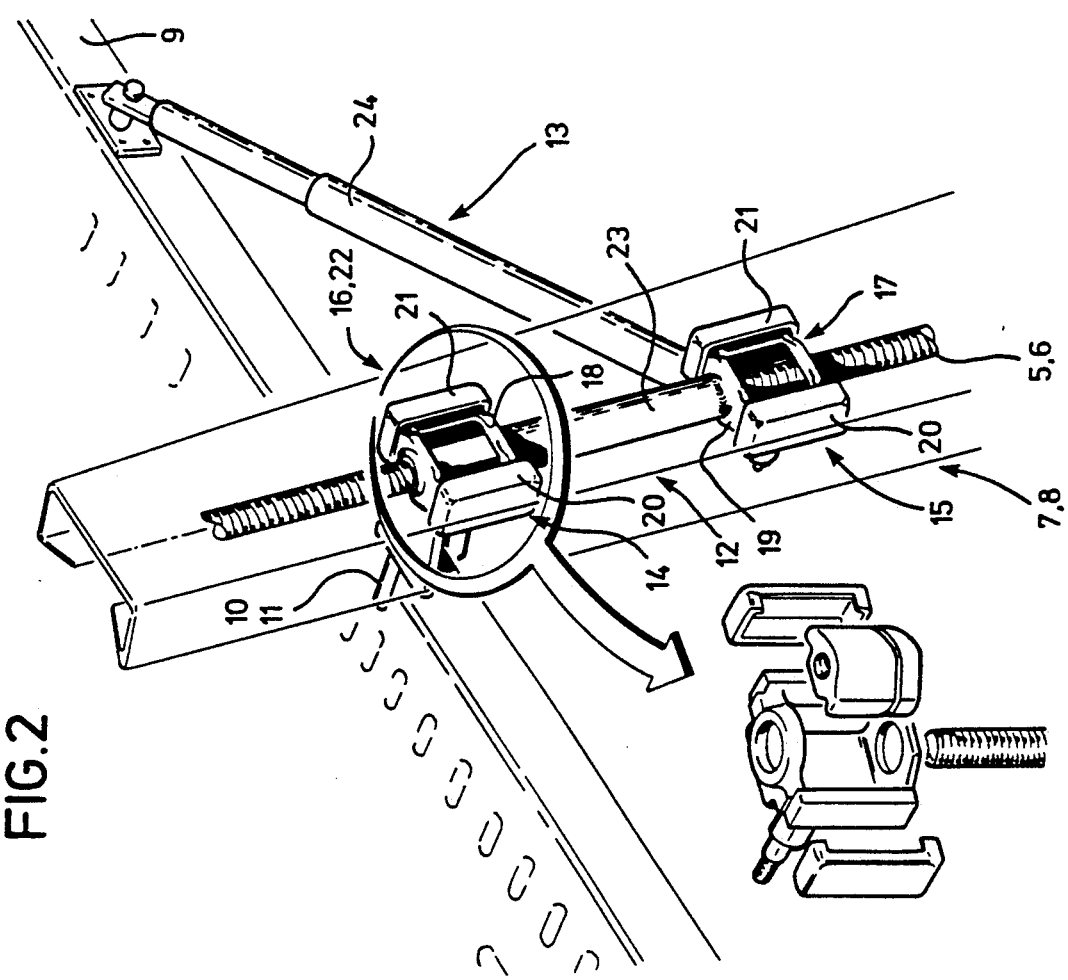
FIG. 2 is a simplified view in perspective of a post, of the platform and of the lifting mechanism, according to a variant having an upper nut and a lower translation sleeve, rigidly interconnected, and a telescopic rod, with enlargement of the upper nut.
Figure 7:
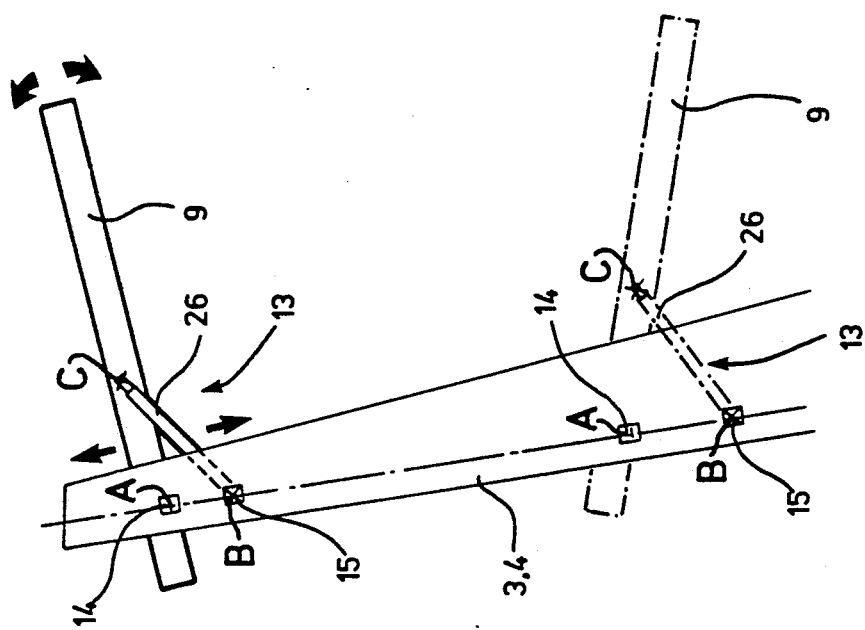
FIG. 7 is a corresponding functional diagram illustrating the two extreme positions of the movable platform, one high and the other low.
Figure 6:
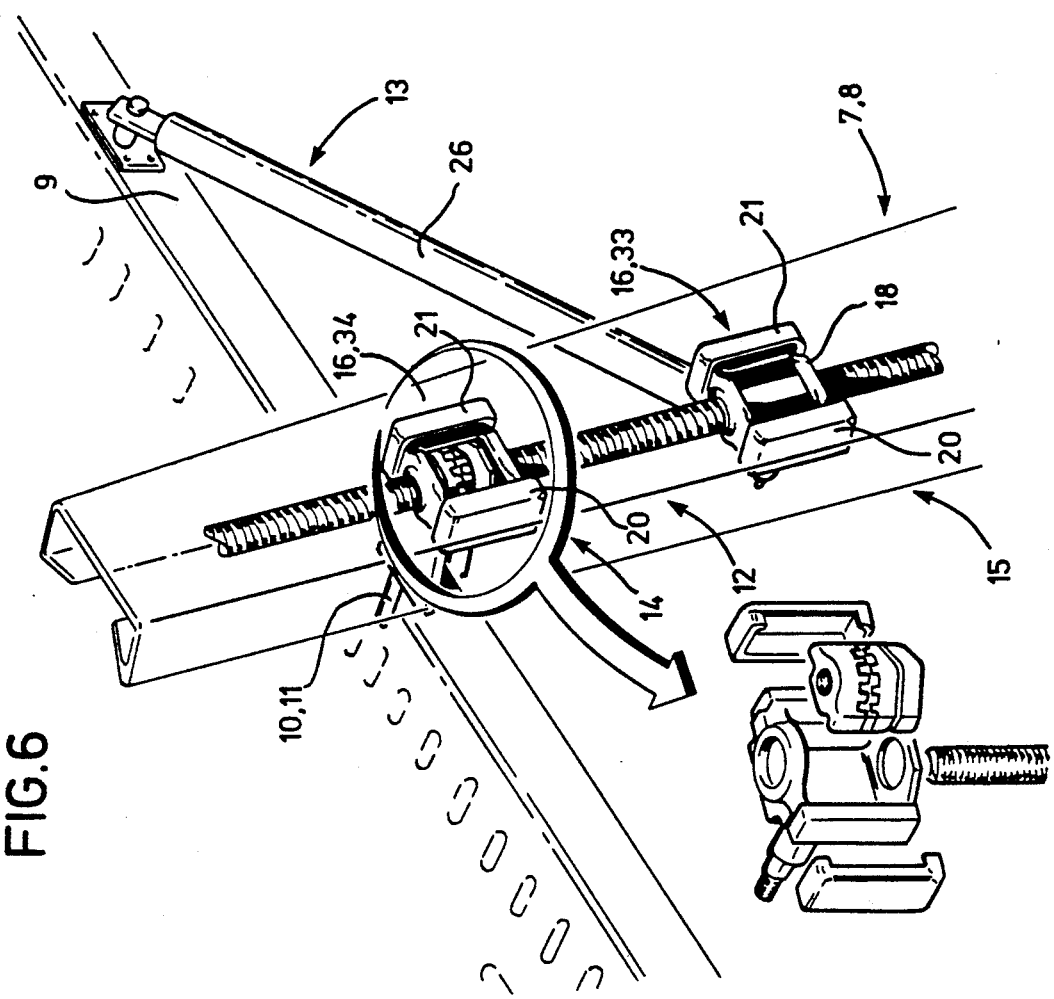
FIG. 6 is a simplified view in perspective of a post, of the platform and of the lifting mechanism, according to a variant with an upper disengageable nut, a lower plain nut and a rod of fixed length, with enlargement of the disengageable nut.
Figure 9:
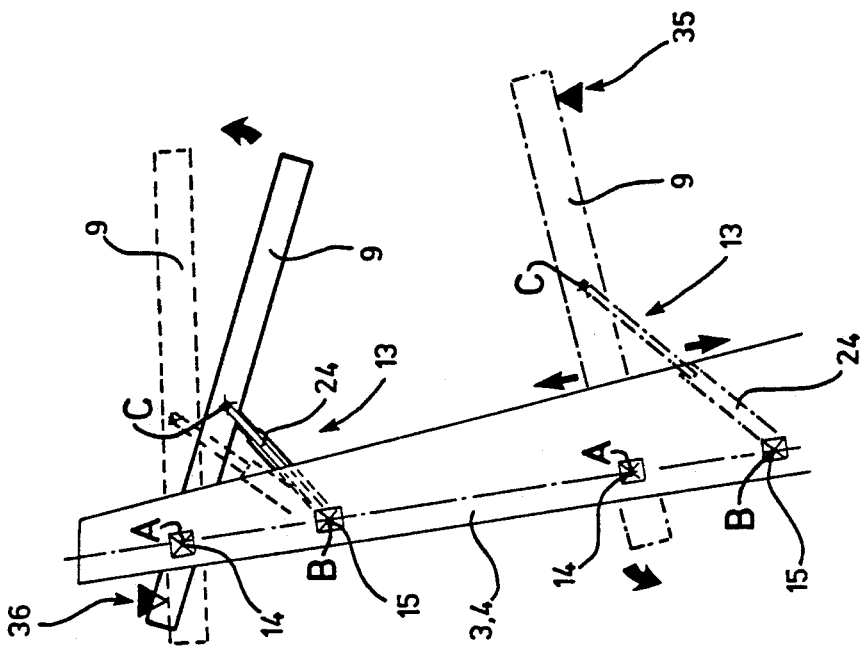
FIG. 9 is the corresponding functional diagram illustrating two extreme positions of the movable platform, one high and the other low.
Figure 8:
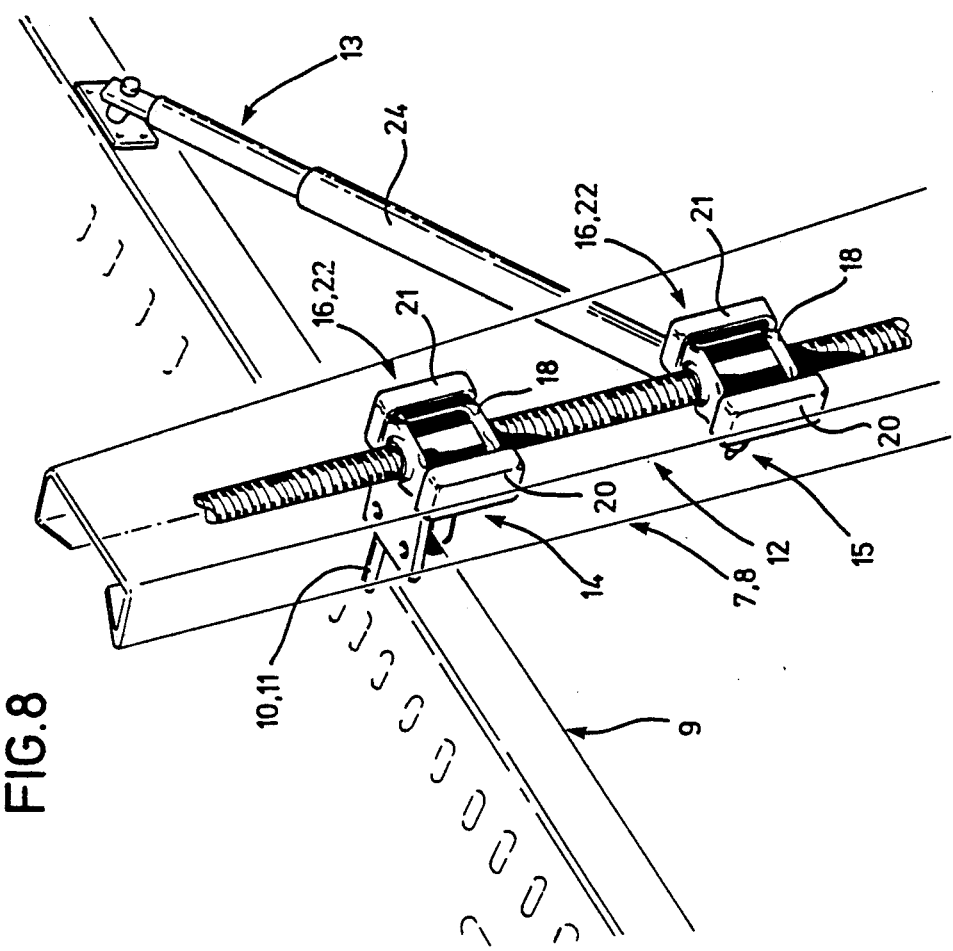
FIG. 8 is a simplified view in perspective of a post, of the platform and of the lifting mechanism, according to a variant having two nuts and a rod of variable length.
Figure 11:
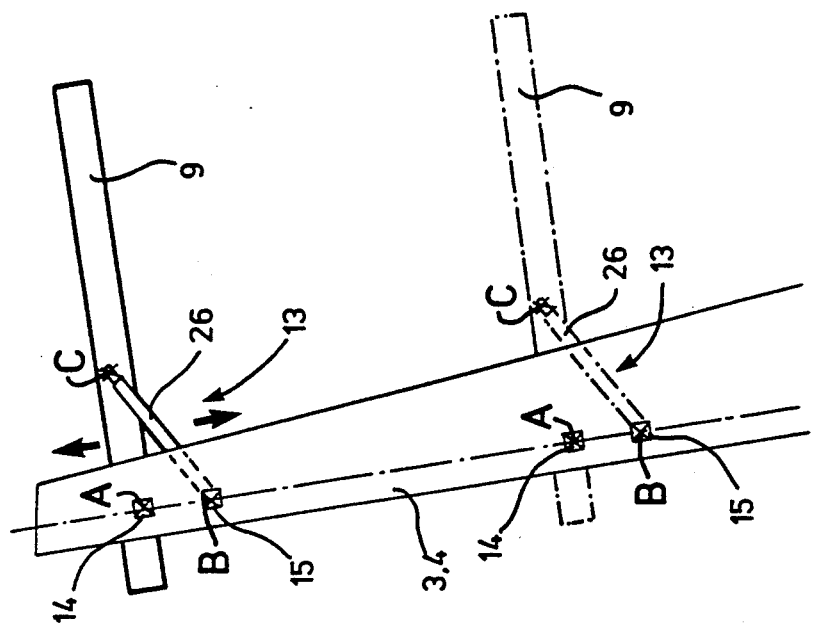
FIG. 11 is the corresponding functional diagram illustrating two extreme positions of the movable platform, one high and the other low.
Figure 10:
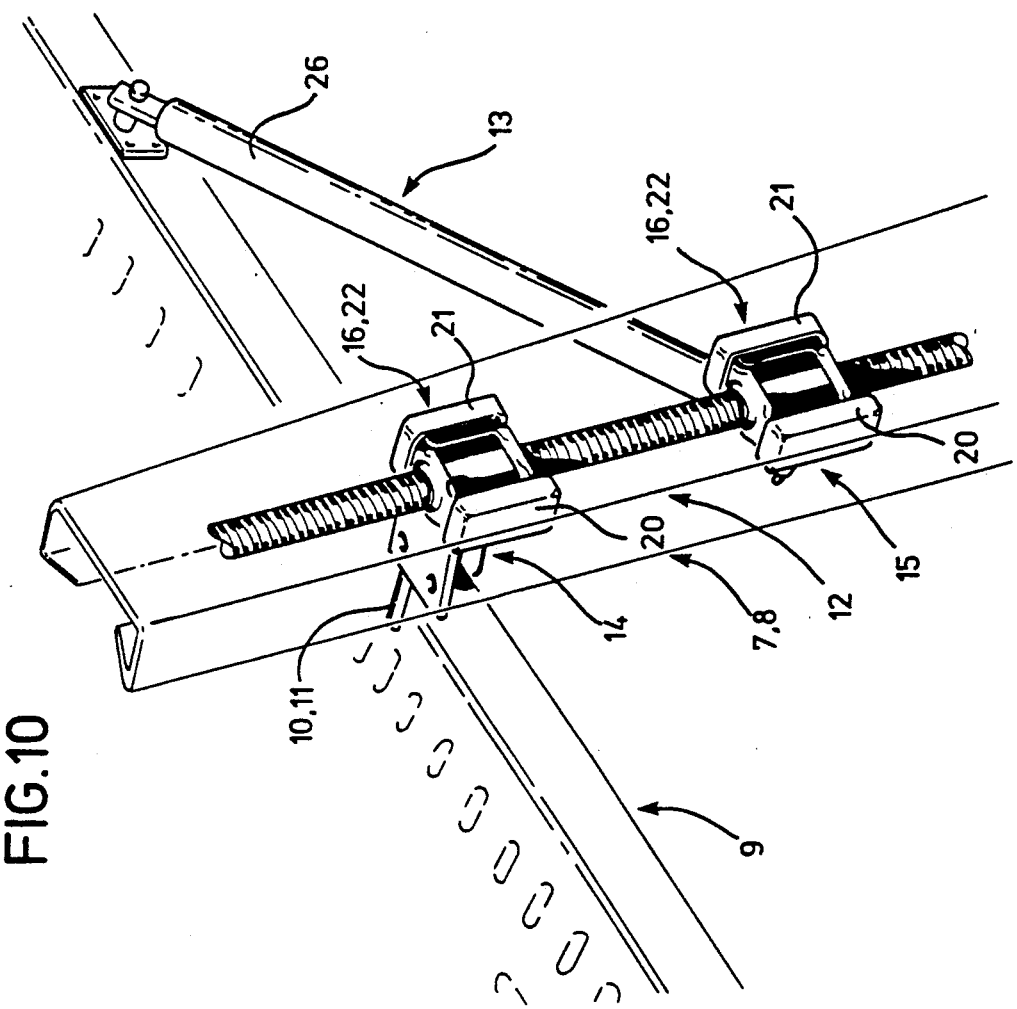
FIG. 10 is a simplified fiew in perspective of a post, of the platform and of the lifting mechanism, according to a variant having two nuts and a rod of fixed length.
Figure 13:
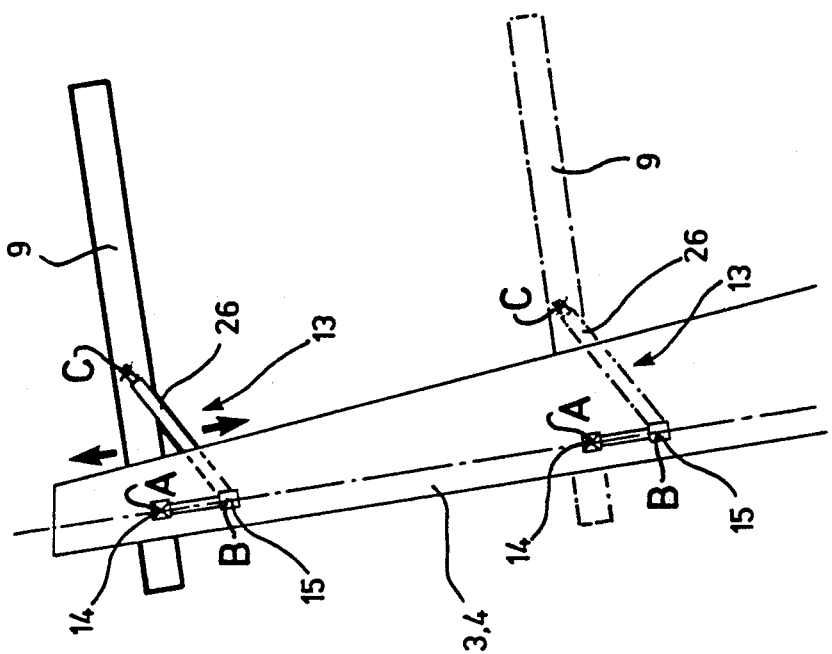
FIG. 13 is a corresponding functional diagram illustrating the two extreme positions of the movable platform, one high and the other low.
Figure 12:
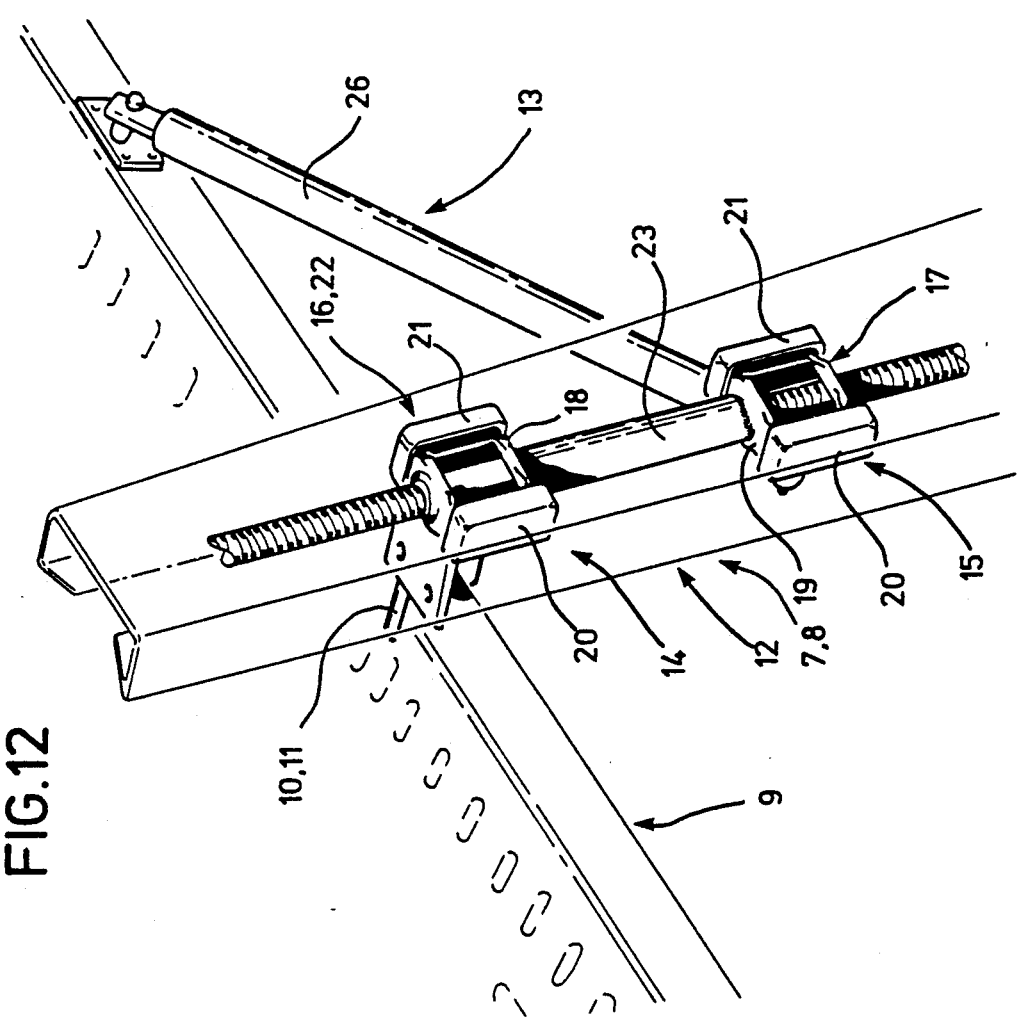
FIG. 12 is a simplified view in perspective of a post, of the platform and of the lifting mechanism, according to a variant having an upper nut and a lower translation sleeve, rigidly interconnected, and a rod of fixed length.
Figure 17:
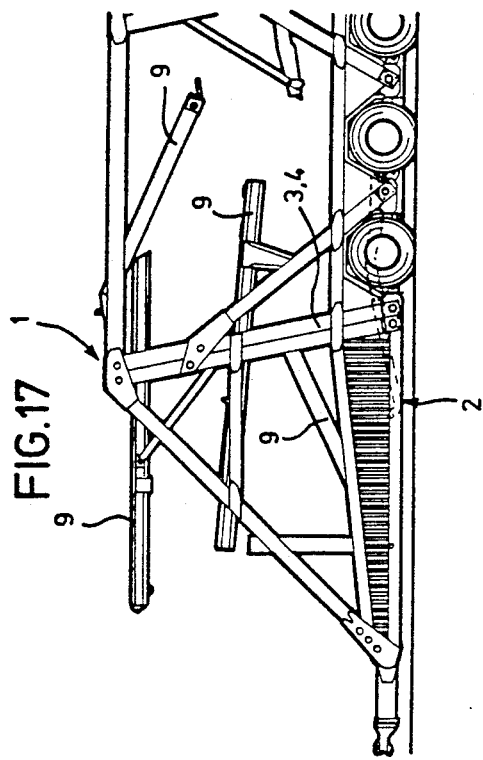
FIGS. 16 and 17 are schematic cross-sectional views illustrating two examples of carrier assemblies with a single post and with a double post.
Figure 19:
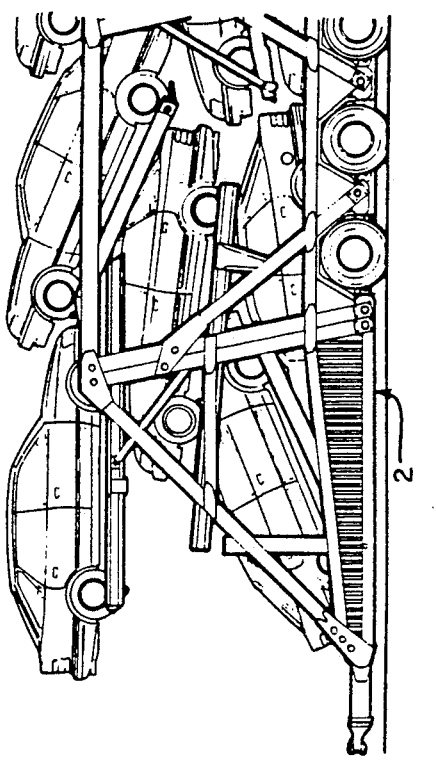
FIGS. 18 and 19 are similar views, automobiles loaded.
Figure 16:
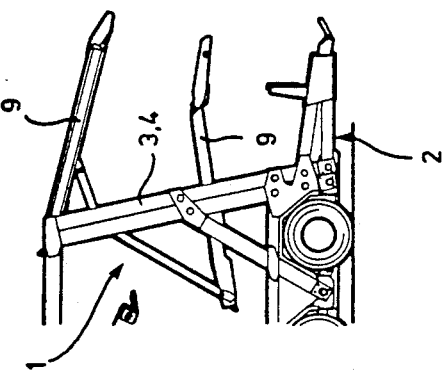
Figure 18:
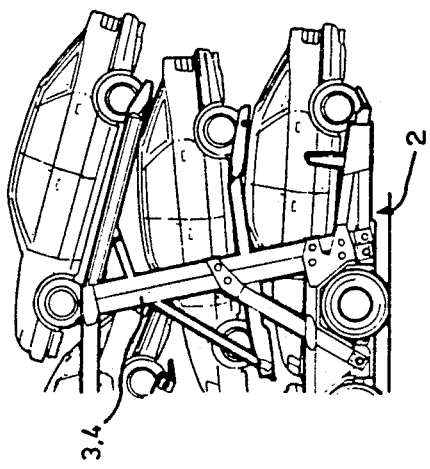

The present invention covers the different variants of linkage and carrier mechanisms, represented in FIGS. 2 to 15. The following variants are shown:

FIGS. 2 and 3:
AB of constant length
BC of variable length
permitting all movements of translation and swivel of the platform;

FIGS. 4 and 5:
AB of variable length
BC of fixed length
permitting all movements of translation and swivel of the platform;

FIGS. 6 and 7:
AB of variable length
BC of fixed length
permitting all movements of translation and swivel of the platform;

FIGS. 8 and 9:
AB of constant length
BC of variable length
permitting all movements of translation and swivel of the platform;

FIGS. 10 and 11:
AB of constant length
BC of constant length
permitting a simple parallel displacement of the platform;

FIGS. 12 and 13:
AB of constant length
BC of constant length permitting a simple parallel displacement of the platform;

FIGS. 14 and 15:
AB of variable length
BC of constant length
associated with a sliding mechanism of the platform, permitting all the desired movements of the platform with regard to a horizontal axis.

As will be seen below, according to the variants, the blocks 14 and 15 will be constituted differently so as to permit variation in distance between A and B and, if necessary, variation in length of the linkage BC.

Depending upon the case, the elements carried by the screws are nuts 16 permanent or selective engagement with the screw or sliding sleeves 17.

The cages such as 18 and 19 respectively of the nuts and sleeves are furnished laterally with shoes 20 and 21 sliding along the posts 2 and 3 in order to secure immobilization of the nut in rotation on itself and then the alignment and stability of longitudinal movements.

According to the embodiment of FIG. 2, the upper block 14 is a nut 22 in permanent engagement with the screw. The cage 18 of the latter is rigidly connected to the cage 19 of the lower block by a cylinder 23. The latter is a sliding sleeve 17 traversed by the screw. Hence the distance AB is kept mechanically constant.

The cage 19 of the sleeve 17 supports the articulation B of the inclined linkage 13. The latter, according to this embodiment, is extensible, accomplished for example in the form of a telescopic rod 24 or by a jack constituting a functional equivalent thereof.

Rotation of the screw acts on the nut 22 which is displaced by translation upward or downward, carrying the sliding sleeve 17 along in its movements along the corresponding post by its subjection to it by the cylinder 23.

Since the distance AB remains constant, the movements of inclination are effected by extension or withdrawal of the telescopic rod 24, which may be an active rod, jack or other, or by the action of a lower stop 25 arranged at the bottom at the end of the platform to produce a low end-of-travel inclination, for example, an inclination corresponding to the loading position of the vehicle.

The weight of the loaded vehicle will automatically push the rod into retracted position, that is, reduce the distance BC to its minimum value after an intermediate lifting phase in the course of which the platform tilts downward.

In the embodiments of FIGS. 4 to 7, the inclined linkage 13 corresponds to a constant distance BC realized, for example, in the form of a rigid rod 26, that is, of fixed length.

The variations of inclination are provided by increases or decreases of the distance AB, accomplished in two different ways corresponding to the variants represented in FIGS. 4, 5 and 6, 7.

The first variant comprises the same blocks, nut 22 and sliding sleeve 17 as the one previously described.

According to a preferred embodiment, the arrangement is inverted: the nut 22 in lower position and the sliding sleeve 17 in upper position.

An external limit linkage 27 is established simply in the form of, for example, a rigid pin 28 firmly joined at one of its ends to the cage 18 of the nut 22 by means of a connecting plate 29 and guided slidably by a tab 30 in one piece with the cage 19 of the sliding sleeve 17 or any other equivalent means, for example a chain or a cable.

In order to limit the distance apart of the two blocks, a stop, for example a bulge 31 or any other means, is provided at the end of the pin 28.

In operation, the distance AB is established at its maximum value by the weight of the platform empty or loaded being reflected by the action of the swivel couple on the sleeve in upper position, producing the correlative rise of the latter along the screw over a distance ending at the end stop 31 of the pin 28, thus determining the inclination of the platform in its extreme low position.

This inclination is maintained in the rise-lifting phase until the high end-of-travel position of the platform by the action of a high point of support, for example, a stop 32, against which the end of the upper face of the platform comes to bear to cause it to tilt upward (as represented by the arrows), by the effect of the couple resulting from the push upward of the lower nut.

The variant represented in FIGS. 6 and 7 obtains the same effects without requiring the presence of a tilt stop in high position.

It comprises a lower block 15 in the form of a nut 33 similar to the nut 22 in permanent engagement on the screw. The upper block is a known disengageable nut 34, for example, of the type conceived and protected by the applicant.

The disengageable nut 34 permits selective engagement of the nut on the screw from an exterior release or engagement control. Thus, simply by acting on this control, one may, by engagement or release, cause the distance AB to vary during rotation of the screw and thus determine the inclination of the platform.

In practice, only the high and low end-of-travel inclinations are utilized in use in vehicle transport. In effect, the inclination of the low position corresponds to loading, that is, to ascent of the vehicle onto the platform and the inclination of the high position to the presentation of the vehicle during transport.

It then suffices to program the disengageable-nut control before arrival in these extreme positions, high and low, for the inclination to be at its predetermined high and low end-of-travel value.

Another variant represented in FIGS. 8 and 9 presents identical blocks, upper 14 and lower 15, realized in the form of nuts such as those designated 22. The inclined linkage 13 is of variable length in the form of a telescopic rod, for example the one already designated 24, or a jack.

These nuts, of identical pitch, carried along by the same screw, are displaced from one another at a constant distance. Hence AB remains constant in length.

Since BC is variable, an operating configuration in platform position similar to that of the first variant is found. The movements of inclination of the platform are effected by extension or withdrawal of the telescopic rod 24 or of its replacement jack.

Thus, in low position contact with a bottom stop 35 begins inclination and the length of extension of the rod determines the amplitude of the inclination and the final low-end-of-travel presentation of the platform corresponding to the loading position of the vehicle.

As for the first variant, the weight of the vehicle loaded will automatically force the telescopic rod into retracted position downward, that is, reduce the distance BC to its minimum value, after a first lifting displacement, which will raise the platform from its bottom limit support, is carried out.

The platform will tilt accordingly to maintain this inclination until in high end-of-travel position or until a possible second stop 36 represented in dashes can raise the platform by tilting.

The variants represented in FIGS. 10, 11 and 12, 13 are simplified variants which permit a translation only at fixed inclination.

In effect, according to these variants, the two blocks, upper 14 and lower 15, are either identical, realized in the form of nuts such as those already designated 22, or different, connected by a rigid cylinder, for example, the one already designated 23. The inclined linkage 13 presents a rod of fixed length 26 each time.

The nuts, of identical pitch, carried along by the same screw, are displaced at a constant distance apart, AB and BC remaining constant in length. The movements of the screw produce a general longitudinal displacement along the posts.

In the same way, the cylinder 23 maintains the blocks 14 and 15 at a constant distance apart.

A variation comprising a supplementary translation mechanism 37 is represented in FIGS. 14 and 15.

This variant proceeds from the same general inventive concept according to which the movements of the carrier platform are obtained from a single screw per post, the screw being drawn into rotation by a single driving force.

Thus, according to this variant, movements of displacement of the platform transversely to the carrier posts are obtained in addition.

According to this variant, the blocks, upper 14 and lower 15, are realized in the form of two disengageable nuts 38 and 39.

The articulated linkage 13 is a rod of fixed length such as the one already designated 26.

The carrier linkage between the platform and the post is of the swivel-sliding type by means of a sliding block or a shoe 40 on which an edge section 41 of the platform is displaced.

The assembly is completed by a sliding mechanism 42 realized by an articulated linkage 43 in the form of an inclined rod 44 articulated on the platform on the one hand and, on the other, on a block, for example, an upper nut 45 similar to those already described, thus establishing a supplementary triangulation designated DAF, D being the articulation with the screw and F with the platform.

The movements in inclination and in displacement of the platform along facing carrier posts result from selective control of engagement or disengagement of the disengageable nuts 38 and 39.

For purposes of programming and coordination of movements, the sliding movements of the platform have been directly subjected to those of the screw by means of the nut 45 and of the articulated linkage 43 of constant length.

The presence of disengageable nuts makes it possible to obtain and to select separately all possible movements of the platform:
parallel displacement alone when all nuts are engaged;
swivel alone when only the lower nut is engaged;
sliding alone when the two disengageable nuts are out of engagement.

In addition, by acting on the individual controls, all combinations of the preceding movements may be effected.

Of course, other methods of operation prove to be possible when the nut 45 is replaced by the variuos blocks examined—translation sleeve, disengageable nut—and the linkage 43 is replaced by a telescopic rod or a jack constituting its functional equivalent.

As may be seen in FIGS. 16 to 19, one specific application concerns loading and support of automobiles during transport on an automobile transport vehicle.

It is readily understood that the invention offers multiple possibilities of inclination of automobiles in transport position, making it possible to take advantage of the free volume in the wheel base, under the front and under the rear of the vehicles transported.

Further, the inclinations of the platforms in extreme positions, high and low, may be predetermined and identical to each stop of the screw at the end of travel in lifting or descent.

Finally, a single control suffices to automatically put a vehicle in place in its transport position, taking account of the relative positions of other automobiles to be loaded with the object of a maximum loading coefficient.

The numerous advantages of these unitary carrier and lifting assemblies make them particularly suitable for automobile transport vehicles.

The invention has been described above in detail. However, it is understood that various simple modifications, additions, direct variants and/or substitutions by equivalent means fall within the scope of the present protection. It is therefore to be understood that within the scope of the appended claims, the present invention may be practiced otherwise than as specifically described herein.

I claim:

1. A support assembly, comprising:
   a pair of laterally spaced upstanding support posts (3,4);
   a platform (9) interposed between said laterally spaced upstanding support posts (3,4);
   first means (14) operatively connected to said platform (9) at a first location (A) upon said platform (9) and movable along said posts (3,4) so as to permit movement of said platform (9) with respect to said posts (3,4);
   second means (13) having one end thereof movably mounted upon said posts (3,4) at a second location (B) which is spaced upon said posts (3,4) a first distance (AB) from said first location (A) of said first means (14) upon said platform (9), and a second end thereof operatively connected to said platform (9) at a third location (C) which is spaced a second distance (BC) from said second location (B) of said one end of said second means (13) movably mounted upon said posts (3,4);
   drive means (5,6) operatively connected with said first means (14) and said one end of said second means (13) for moving said first means (14) and said one end of said second means (13) along said support posts (3,4); and
   means for defining said first and second distances (AB,BC) between said first and second locations (A,B), and between said second and third locations (B,C), so as to satisfy one of the relationships wherein (1) said first distance (AB) is fixed while said second distance (BC) is variable, (2) said first distance (AB) is variable while said second distance (BC) is fixed, and (3) said first and second distances (AB, BC) are both fixed, while said drive means (5,6) is operatively driven so as to move said first means (14) and said one end of said second means (13) along said support posts (3,4) whereby the orientation and location of said platform (9) relative to said posts (3,4) may be predeterminedly defined.

2. A support assembly as set forth in claim 1, wherein: said platform is disposed upon an automotive transport vehicle for supporting automotive vehicles.

3. A support assembly as set forth in claim 1, wherein:
said first means comprises means for pivotably mounting said platform upon said posts; and
said second means comprises means for pivotably mounting said one and second ends thereof upon said posts and said platform, respectively.

4. A support assembly as set forth in claim 1, wherein: said drive means comprises a rotatable screw disposed within each one of said upstanding support posts.

5. A support assembly as set forth in claim 4, wherein:
said one end of said second means comprises a nut operatively connected to said rotatable screw so as to move translationally along said posts as said rotatable screw is rotated by said drive means.

6. A support assembly as set forth in claim 5, wherein:
said first means comprises a sleeve slidable along said rotatable screw; and
a limit linkage interconnects said nut and said sleeve within a predetermined range of movement of said nut with respect to said sleeve whereby said first distance is variable within said predetermined range of movement.

7. A support assembly as set forth in claim 6, further comprising:
second stop means disposed at an elevational level corresponding to an upper end region of said support posts so as to engage an end portion of said platform adjacent to said first location of said first means when said platform is elevated along said posts so as to orient said platform with a predetermined amount of inclination with respect to said posts.

8. A support assembly as set forth in claim 4, wherein:
said first means comprises a nut operatively connected to said rotatable screw so as to move translationally along said posts as said rotatable screw is rotated by said drive means.

9. A support assembly as set forth in claim 8, further comprising:

said one end of said second means comprises a sleeve slidable along said rotatable screw; and
a cylinder fixedly interconnects said sleeve and said nut so as to maintain said first distance fixed.

10. A support assembly as set forth in claim 5, wherein:
said first means comprises a nut threadedly engaged with said rotatable screw so as to move translationally along said posts, along with said nut of said one end of said second means, as said rotatable screw is rotated by said drive means whereby said first distance is fixed.

11. A support assembly as set forth in claim 5, wherein:
said first means comprises a nut selectively engageable and disengageable with said rotatable screw so as to operatively cooperate with said nut of said one end of said second means whereby said first distance is selectively variable.

12. A support assembly as set forth in claim 4, wherein:
said first means and said one end of said second means both comprise nuts selectively engageable with and disengageable from said rotatable screw so as to operatively cooperate with respect to each other whereby said first distance is selectively variable.

13. A support assembly as set forth in claim 1, wherein:
said second means comprises an extensible telescopic rod whereby said second distance is variable.

14. A support assembly as set forth in claim 1, further comprising:
stop means disposed at an elevational level corresponding to a lower end region of said support posts and a predetermined distance from said support posts so as to engage a free end portion of said platform remote from said first location of said first means when said platform is lowered along said posts so as to orient said platform with a predetermined amount of inclination with respect to said posts.

15. A support assembly as set forth in claim 1, wherein:
said second means comprises a fixed rod whereby said second distance is fixed.

16. A support assembly as set forth in claim 1, wherein:
said second means is inclined with respect to said support posts such that said first, second, and third locations of said first means, said one end of said second means, and said second end of said second means, respectively, are arranged in a triangular configuration.

* * * * *